United States Patent [19]

Rogers et al.

[11] Patent Number: 4,876,709
[45] Date of Patent: Oct. 24, 1989

[54] ANTENNA FOR CORDLESS TELEPHONE SYSTEM

[75] Inventors: Max W. Rogers, Franklin Park; Daniel R. Skinner, Grayslake, both of Ill.

[73] Assignee: Dynascan Corporation, Chicago, Ill.

[21] Appl. No.: 240,702

[22] Filed: Sep. 8, 1988

[51] Int. Cl.$^4$ .............................................. H04R 1/38
[52] U.S. Cl. ........................................ 379/61; 455/89
[58] Field of Search ...................... 379/59, 61; 455/90, 455/89

[56] References Cited

U.S. PATENT DOCUMENTS

| | | | |
|---|---|---|---|
| 3,824,465 | 7/1984 | Blough | 455/89 |
| 4,471,493 | 9/1984 | Schober | 455/90 |
| 4,672,685 | 6/1987 | Phillips et al. | 455/89 |
| 4,677,657 | 6/1987 | Nagata et al. | 379/63 |
| 4,723,305 | 2/1988 | Phillips et al. | 455/89 |
| 4,790,794 | 4/1988 | Phillips et al. | 343/702 |

OTHER PUBLICATIONS

"Small Antennas", by K. Fugimoto et al., published by John Wiley & Sons, Inc., Jan. 20, 1987, (p. 15).

Primary Examiner—Robert Lev
Attorney, Agent, or Firm—Wallenstein, Wagner & Hattis, Ltd.

[57] ABSTRACT

An antenna internally contained within a housing of a cordless telephone is configured generally as a plate disposed opposite the earphone transducer, and away from the user's face in position for normal use. The antenna is disposed to lie generally vertically, and is counterpoised against a generally vertically disposed circuit board. Configuring the antenna generally as a plate and placing it outboard away from the user's face minimizes detuning effects during normal handling in use. Optional side extensions to the plate increase the antenna capacitance. An optional counterpoising shield may be interposed between the receiver-transducer and the antenna plate to further minimize detuning effects. Mode switches are disposed in a position on the handset remote from the antenna to further minimize detuning effects during switching operations. A similar antenna may be disposed within the cordless telephone base unit with the antenna disposed remote from the surface on which the base unit is mounted, and further having its associated mode switch disposed at a location remote from the antenna so as to minimize detuning effects from proximity to metallic surfaces and mode switching.

31 Claims, 3 Drawing Sheets

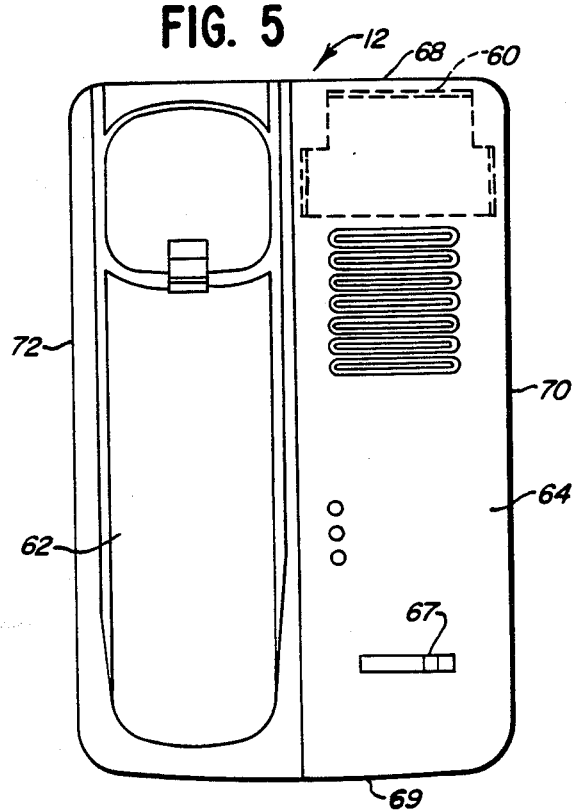
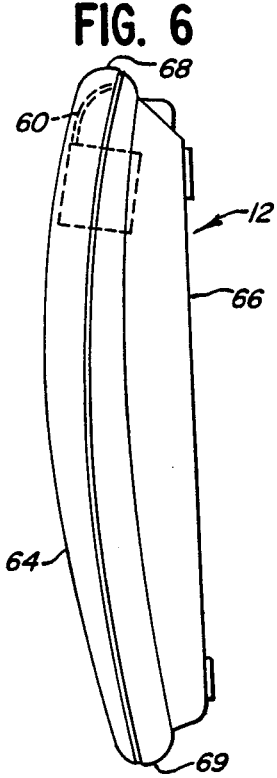
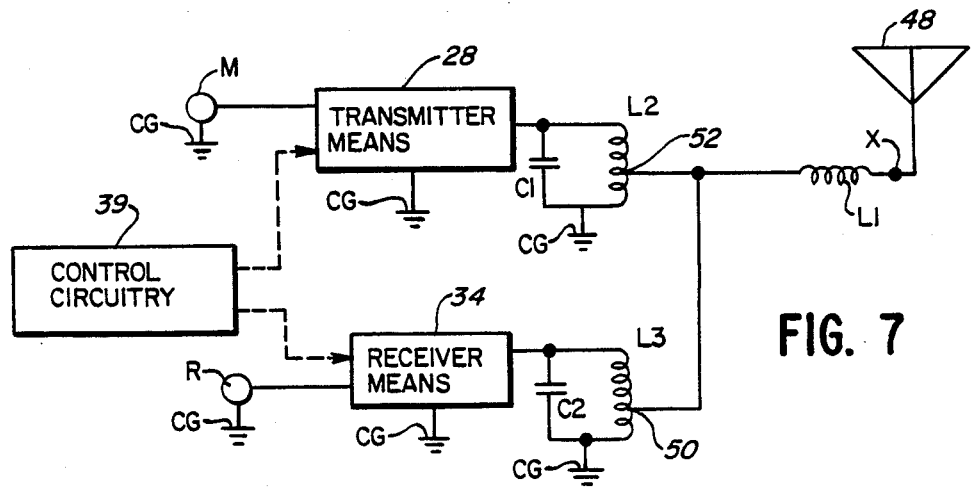
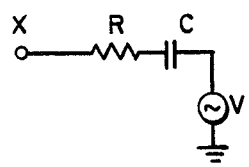

ANTENNA FOR CORDLESS TELEPHONE SYSTEM

DESCRIPTION

Technical Field

The technical field of the invention is the wireless telecommunications art, and in particular antenna systems therefor.

BACKGROUND OF THE INVENTION

Cordless telephone installations are commonly used to allow the user to communicate with the local telephone system by means of two-way radio communication units. Such systems typically consist of a base unit directly connected to the telephone lines and having a transmitter-receiver unit therein configured for two-channel duplex operation. The transmitter and receiver therein are capable of simultaneous operation with a pair of different frequencies in the 46-49 megahertz range. A battery-powered portable handset is also provided, similarly having a duplex transmitter-receiver therein, and tuned to the corresponding base frequencies. Each unit has associated therewith a transmitting-/receiving antenna.

Conventionally such antennas are configured as extensible sub-wavelength whips mounted to extend well beyond their associated housings. Such antennas have certain disadvantages. First, they are readily broken or bent because of their inherently fragile structure. Also, many individuals prefer not to have such visible antenna structures in the home. It is therefore desirable that, if possible, the antenna be completely contained within the handset housing.

Two related problems immediately arise. If a very short whip antenna is employed, then in order to achieve even minimal radiation properties, the whip must extend the full length of the housing. Not only are the radiation properties unsatisfactory, but so extending the antenna into the portion of the housing where the user places his hand will give rise to unacceptable detuning effects, since the proximity of the hand provides additional capacitive loading on the whip.

Improved radiating properties can be secured by configuring the antenna as an inductive spiral, but even in this case a spiral wound antenna having adequate radiating properties must be sufficiently long to extend into the gripping region, again suffering from the above mentioned detuning effect. Attempts to overcome the foregoing problems by fashioning the antenna as a stripline consisting of zigzag metalizations on a printed circuit board proved similarly unsuccessful.

Prior to the instant invention there remained a need for an antenna having adequate radiating properties, and preferably configurable to have its major dimension no longer than approximately 1/100 of a wavelength so to enable it to be placed remote from the gripping portion, and further having sufficient capacitance that proximity effects, either from the user's hand or the closeness of the user's face during use do not introduce unacceptable detuning.

SUMMARY OF THE INVENTION

According to a preferred form of the invention the housing of a cordless telephone is provided with a relatively high capacitance, internally contained antenna-forming plate positioned to avoid significant detuning when the housing is grasped and operated by the user. The plate is about 1/100 wavelength in major dimension. No "mast" or other such standoff extension is employed beyond the necessary connecting lead. The plate is disposed with respect to a chassis ground inside the housing so as to have a relatively high capacitance therebetween and presented to the input side of the loading coil. Both the chassis and the antenna-forming plate are mechanically shielded by the housing, and the plate is located so to be spaced outwardly away from the receiver transducer to minimize detuning effects from the proximity of the user's face. Additionally, the plate is confined to the uppermost part of the housing wall away from the housing portion normally grasped by the user, thus minimizing detuning effects from the proximity of the user's hand. By using such a high capacitance antenna, proximity detuning effects are greatly minimized, since they amount to the addition of only a small fraction of the effective antenna capacitance as seen at the loading coil. Field strength comparisons of the 1/100 wavelength plate antenna with an antenna of approximately 1/20 wavelength indicate nearly identical radiated power output and in both cases apparently identical omnidirectional properties.

Prior art top-loaded antenna-forming plate antennas (heretofore used in environments other than cordless telephones) have a horizontally disposed plate at the top thereof, separated from ground by a significant distance by a feeder mast. In the most advantageous form of the present invention, however, the major plane of the antenna-forming plate is vertically disposed and in generally close proximity to a generally planar chassis ground serving as a counterpoise. The resulting antenna has adequate omnidirectional properties in a plane perpendicular thereto, i.e., parallel to the horizontal plane of the earth. A tunable loading coil is preferably connected directly between the plate and the input stage impedance-matching transformer without the use of a standoff feeder mast.

That such a sub-wavelength plate can have adequate radiating properties in the horizontal direction when vertically disposed appears to have gone unrecognized in the prior art, and finds immediate application in portable cordless telephones. Further to this point it should be recognized that, to the applicant's knowledge, cordless telephone handsets, invariably employ an insulated housing. The radiating element must therefore be counterpoised against a chassis in the form of a printed circuit board. In the case of the present invention the self-capacitance of the antenna plate and that of the printed circuit board (or boards) is at least crudely comparable. As a result, the usual analytical idealizations do not apply, namely that of a radiating element counterpoised against a chassis of extremely high self capacitance. The limiting case, of course, is the antenna counterpoised against the earth itself, which may be taken to be a body of essentially infinite self capacitance.

Thus, it is found experimentally that a quarter wavelength whip antenna which, by conventional analysis, would have a characteristic impedance of 50 ohms is found to have a characteristic impedance of roughly half this value when counterpoised against only a small printed circuit board. It is entirely possible that in such cases the printed circuit board itself contributes materially to the radiation process, and thus the plate antenna of the present invention and its associated circuit board may be likened to a pair of generally parallel radiating plates having roughly comparable self-capacitances and excited by a radio frequency voltage source connected between them. The applicant is unaware of any prior art treatment of the radiating properties of such a structure.

The antenna plate is preferably disposed in the upper end of the handset housing to lie outboard of the earphone transducer so as to be at maximum standoff distance from the user's ear when in use so as to minimize detuning effects arising from the proximity of the user's head. The metallic structures of the earphone transducer are thus interposed between the antenna plate and the user's head, thereby providing further additional capacitive isolation of the antenna.

According to a related feature of the invention an extended shield plate may be interposed between the antenna plate and the earphone transducer, the plate being returned to r.f. ground. This additionally serves to minimize detuning effects.

According to a related feature of the invention, the antenna capacity is further increased by providing at least one or preferably three additional portions to the antenna-forming plate extending at right angles thereto. This serves to further increase the antenna capacitance, but does not appear to be necessary to achieving the necessary horizontal radiation pattern. These portions of the antenna-forming plate are preferably mounted to extend along the top and side walls of the upper end of the cordless telephone housing. The major portion of the plate extends along the rear vertical wall of the upper end of the housing.

According to a related feature of the invention all buttons and switches, i.e., dialing buttons and mode-changing switches are located either centrally disposed on the housing or at the lower portion thereof, so that operation of these elements by the user's hand does not bring the hand in close proximity to the antenna plate.

According to a related feature of the invention the foregoing concepts are similarly applied to the associated base unit of the cordless telephone, a similarly plate-shaped antenna being disposed closely adjacent to the surface of the interior surface of the housing farthest from the mounting surface, so as to minimize detuning effects when the base unit is placed in contact with metallic supporting structures. The radiating properties of the antenna plate are sufficiently independent of orientation that the base unit may be mounted on a horizontal supporting surface, as for example, a table or alternatively against a vertical wall. As in the case of the handset, all switches and operating buttons are preferably disposed to be generally remote from the antenna, again to minimize detuning effects.

Optional side extensions of the antenna-forming plate may be added, these extensions extending generally towards the mounting surface, having as their primary effect the increasing of the antenna capacitance, thereby improving the radiating properties thereof.

Other features and advantages of the invention will become apparent upon making reference to the specification and drawings.

BRIEF DESCRIPTION OF SEVERAL VIEWS OF DRAWINGS

FIGS. 5 and 6 are plan and side views respectively of a base unit for use with the handset of FIGS. 2-4.

FIG. 7 is a block schematic diagram of the circuit of a receiver-transmitter contained, within the handset of FIGS. 2-4.

FIG. 8 is a schematic view of the equivalent circuit of an antenna less than ¼ wavelength long.

DETAILED DESCRIPTION OF THE EXEMPLARY EMBODIMENT OF THE INVENTION

Figure 2:
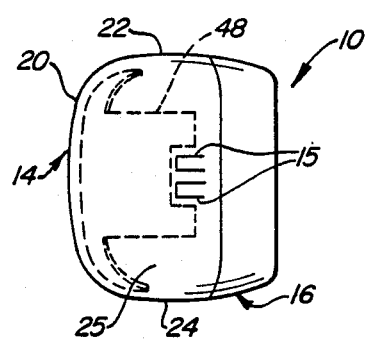
FIGS. 2, 3 and 4 are a top view, a partially cutaway side view, and a front elevation of a handset for a cordless telephone.
Figure 3:
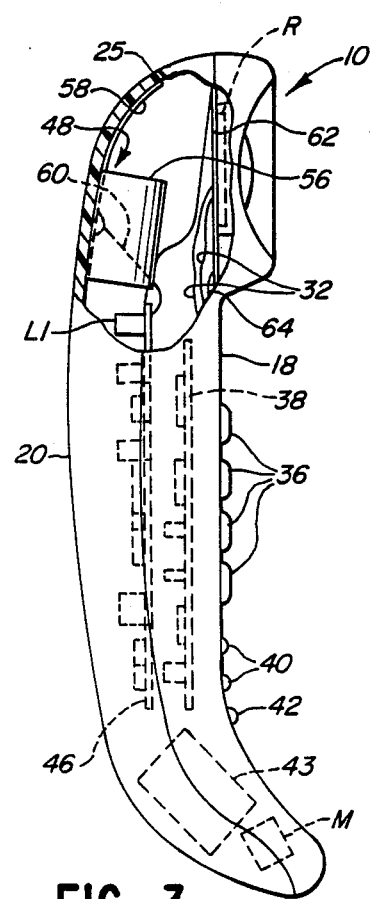
Figure 4:
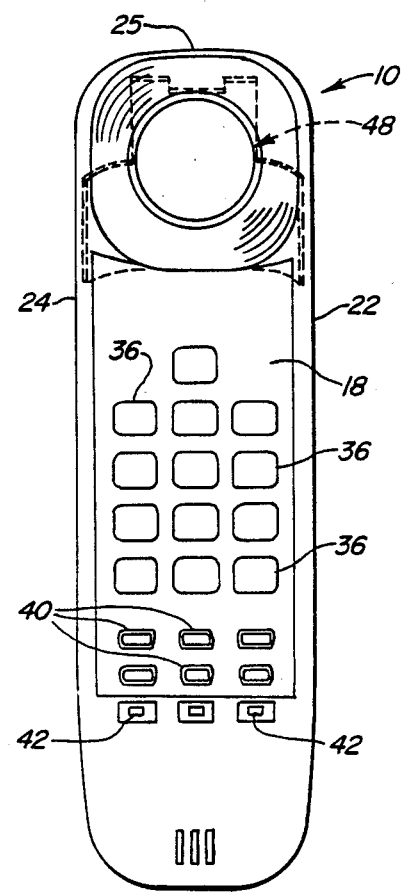

Referring now to the Figures, FIGS. 2-4 show a handset 10 containing a transmitter-receiver to be used with a base unit 12 (FIGS. 5-6) similarly provided with a transmitter-receiver. The base unit 12 is provided with cabling (not shown) for direct connection with telephone lines. Two-way communication between the base 12 and the handset 10 is carried out by two-channel duplex radio frequency transmission therebetween.

Figure 9:
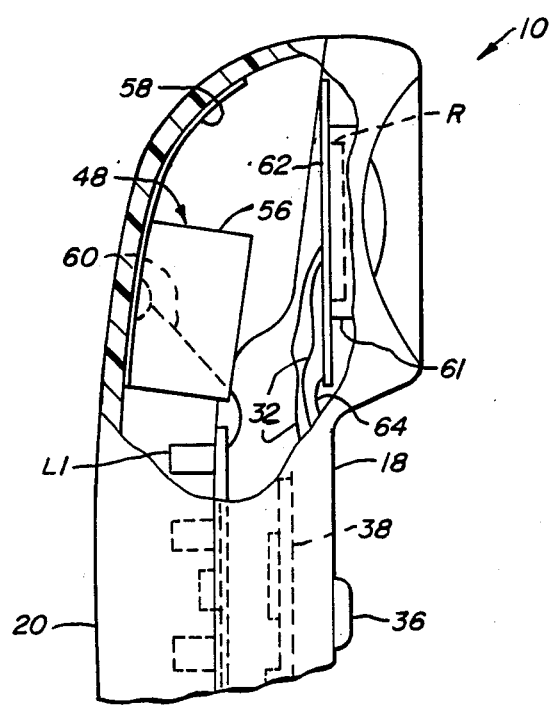
FIG. 9 is a partially cutaway view of the upper portions of the handset of FIG. 3.

FIG. 7 shows in symbolic form the broad circuit aspects of the transmitter-receiver in each unit. FIGS. 3 and 9 show in more detail the principal elements of an exemplary transmitter-receiver circuitry. The handset 10 is configured along the general lines of a telephone handset, having a two-piece housing consisting of a rear shell 14 and a front shell 16 joined together by snap-in fingers 15 to form a housing having a major front wall 18 and a generally opposed rear wall 20 joined by minor side walls 22, 24 and a top cover wall 25. A microphone M is placed at the bottom end of the housing of the handset 10 and is connected to the transmitter means 28 of FIG. 7. At the upper end of the housing 10 and on the same wall 18 is mounted an earphone transducer R typically of the very thin piezoelectric variety connected by wires 32-32 so as to be driven by the receiver means 34.

An array of buttons 36-36 are mounted on the front wall 18 of the handset tone for touch-tone dialing, these buttons when depressed touching associated pads (not shown) on a processor board 38 mounted within the handset 10, and containing the principal elements of low-frequency circuitry in the control means circuitry 39 governing operation of the transmitter means 28 and the receiver means 34. Indicator lights 40 powered from the processor 38 indicate various aspects of the status of the electrical system as desired, e.g., the state of the battery 43 contained within the handset 10 and providing power to the electrical systems thereof. Additionally, mode switches 42 are mounted on the front wall 18, these switches being used to select the various operating modes of the system, e.g., "redial" and "tone-pulse". The radio frequency elements of the transmitter means 28 and receiver means 34, are mounted on an r.f. board 46.

It will be noted from FIG. 7 that the transmitter means 28 and receiver means 34 are both coupled through taps on their associated resonant circuits L2-C1 and L3-C2 through a loading coil L1 to an antenna 48. For two-channel duplex communication, the transmitter means 28 and receiver means 34 will be tuned to two different frequencies several megacycles apart in the general vicinity of 45 megahertz by their associated resonant circuits L2-C1 and L3-C2 respectively. Each is matched to the antenna 48 through the loading coil L1 by properly located taps 50, 52 on the associated resonant circuit inductors L3 and L2 respectively.

The function of the loading coil L1 is to resonate with the antenna 48 at a given frequency. Since the transmitter means 28 and the receiver means 34 operate at somewhat different frequencies, a minor correction to this resonant characteristic is carried out by the resonance circuits L2-C1 and L3-C2 respectively. Thus, considering for purposes of discussion only the center frequency between the two duplex channels, inductor L1 will generally be chosen to resonate with the effective antenna capacitance C shown in FIG. 8. FIG. 8 hows the equivalent circuit of a short antenna consisting of a voltage source V generally governed by the effective radiation capture cross section of the antenna 48, a capacitance C, and a resistor R representing the radiation resistance of the antenna, and for purposes of analysis taken to include also the losses in the loading coil L1.

For grossly sub-wavelength antennas in the 50 megahertz range (6 meter wavelength) the capacitance C will be the order of 5-20 picofarads and the resistance R will be of the order of 5 to 30 ohms. The capacitive reactance of the capacitor C will thus be many hundreds of ohms, resulting in significant voltage drop between, for example, the antenna 48 and the receiver means 34 when the tap 50 is chosen to make the reflected input admittance of the receiving means 34 equal to the radiation resistance R, which is the condition for maximum antenna power transfer. The loading coil L1 is generally tuned for resonant cancellation of this capacitive reactance so as to maximize power transfer from the antenna. Similar considerations apply to matching the output of the transmitter means 28 to the antenna radiation resistance R for maximum antenna power output.

Further with respect to the problem of resonating against the antenna capacitance C, this capacitance is in the range of only tens of picofarads, and any significant variation of this capacitance in use can pull the antenna off resonance with respect to the loading coil L1, thereby causing unacceptable mismatch between the antenna 48 and the transmitter means 28 or the receiver means 34. Prior to the instant invention, attempts to place a small wire antenna within a handset resulted in an antenna of inefficient radiation capture cross-section to develop adequate voltage V (FIG. 8). Further, its capacitance C would be sufficiently small that merely placing the handset next to the user's ear would cause the effective capacitance to be sufficiently upset as to detune the match between the antenna and the transmitter/receiver to an unacceptable degree. A similar detuning effect would also occur if the user's hand were to be placed too close to that portion of the housing containing the antenna. Prior to the antenna design of the instant application, it was found impossible to place within a handset an antenna having significant capacitance so as not to be severely detuned by the proximity of the user's ear or hand to the handset, and also having sufficient radiation capture cross-section to provide adequate sensitivity.

Figure 1:
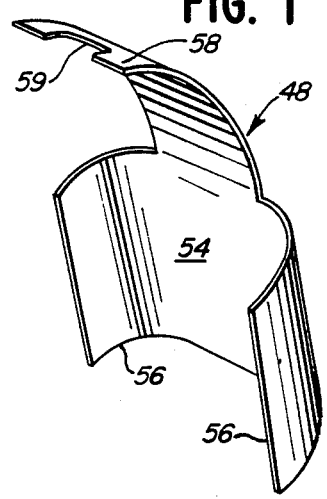
FIG. 1 is a perspective view of an antenna generally configured as a plate.

An unexpected property of a plate-formed antenna has led to an antenna design of 1/100 wavelength which can be successfully incorporated into a handset. The antenna-forming plate of the preferred form of the present invention is shown in FIG. 1. This plate 48 has a main generally planar vertical central portion 54, a pair of forwardly horizontally projecting side extensions 56-56 at the lower portion thereof, and a forwardly and horizontally extending preferably curved top end extension 58 at the upper end of the main central portion 54. These portions 54, 56-56 and 58 are sized and positioned to extend along the end surfaces of the housing rear, side, and curved top walls 20, 22-24 and 25 respectively of the rear handset housing shell 14. FIGS. 2-4 and 9 show the antenna 48 installed within the handset 10 to be generally outboard of the earphone transducer R. In the exemplary form the transducer R is of the piezoelectric type and is completely contained within a disc-shaped metallic housing disposed within a cylindrical boss 61 (See FIG. 9) extending rearwardly from the front handset wall 18.

It will be noted that the central portion 54 of the antenna 48 is in coterminal contact with the interior surface of the rear handset wall 20, and that extensions 56-56 generally follow the sidewalls 22, 24, and that the end extension 58 generally follows the interior terminal curve of the rear wall 20 in the vicinity of the transducer R. In the exemplary form, the antenna 48 spans the entire interior width of the rear handset wall 20. The side extensions 56 and the end extension 58 both are configured in the exemplary embodiment of the invention to extend approximately half of the distance between the central portion 54 of the antenna 48 and the earphone transducer R. Also, the vertical extent of the side extensions 58 is less than one-half the width of the central portion 54 and the overall length of the central portion plus the end extension 58. The antenna plate 48 may be cemented to the interior surface of the rear handset wall 20, or may be configured for snap-in engagement with suitably configured bosses within the housing. A cutout 59 in the end extension 58 accommodates the interior structures engaging the snap-in fingers (FIG. 2) holding the housing shells 14, 16 together. The loading coil L1, mounted at the extreme end of the r.f. board 46, is connected generally centrally to the interior of the central portion 54 of the antenna plate 48 by an antenna lead 60.

The antenna 48 is thus counterpoised against the chassis grounds (CG in FIG. 7) of the r.f. board 46 and the processor board 38, these two grounds being connected together by means not shown. The metallic structures of the earphone transducer R are returned to r.f. ground, and provide a measure of shielding against detuning by the proximity of the user's ear. A further degree of isolation may optionally be secured by an extended shield disk 62 (See FIG. 9) mounted upon the transducer-accepting boss 61 and thus disposed generally between the antenna plate 48 and the transducer R and returned to chassis by a ground wire 64. This will further reduce the residual detuning effects if desired. The shield disc 62 may be made of any good electrical conductor such as copper foil 0.05 mm. thick and having major dimensions of, for example 5 cm. by 4 cm. The major dimension of the antenna 48, including the end extension, is 7 centimeters (about 1/100 wavelength at 6 meters). Its transverse dimension is 3 cm, and the side extensions are 2 cm. by 3 cm. It is preferably formed from copper foil 0.5 mm. thick. The diameter of the transducer R is 3.5 centimeters.

It will be further noted that the antenna 48 is counterpoised against the grounding metalizations of the r.f. board 46, which are disposed generally parallel to the roughly planar central portion 54 of the antenna. If the optional shield 62 is employed, this shield is also similarly forms a part of the counterpoise to the antenna, and again is generally parallel to the central portion thereof. It will be further noted that in use the antenna plate 48 is disposed to lie in a generally vertical plane.

Thus, the radiating system is in the general form of a vertical plate counterpoised against one or more vertically planar parallel conductors. Contrary to what one would normally expect, the antenna distribution pattern in horizontal directions is quite adequate for normal communication distances at transmitter field intensities held within FCC standards, an unexpected result in view of the prior art. The side extensions 56–56 and the end extension 58 do not appear to contribute materially to the distribution pattern, but seem to have the primary effect of increasing the antenna capacitance, and thus assist in minimizing detuning effects.

Field tests were conducted comparing the radiated intensity of a 13½ inch (1/20 wavelength) whip antenna against a plate antenna as previously described. The transmitter circuitry was identical in both cases. The field strength was measured at a given distance from both units. It was found that the plate antenna yielded output power closely comparable to the whip, and that the plate antenna had generally omnidirectional properties as well.

It will be further noted with respect to detuning effects that the mode switches 42 are placed toward the microphone end of the handset, thus further minimizing detuning effects when the user's hand engages these switches to shift the operating mode of the handset 10. In the configuration shown the plate antenna 48 has a capacitance of approximately 5 picofarads and an effective resistance R (FIG. 8) of 15 ohms. This latter figure also includes the losses in the loading coil L1.

FIGS. 5 and 6 show a generally similar antenna-forming plate 60 disposed within the housing of a base unit 12. The base unit has a housing with a bottom wall 66, a top cover-forming wall 64, end walls 68 and 69, and side wall 70 and 72. It contains a similar transmitter-receiver (not shown), and is provided with a cradle section 62 for accepting the handset 10. The base unit may be configured for table mounting, or alternatively for vertical wall mounting. Here the space requirements are by no means as severe as in the case of the handset 10, and the antenna-forming plate 60 may be extended significantly if desired to increase its capacitance, depending upon the location of the components within the unit. It will be noted in FIG. 6 that the antenna 60 is preferably mounted along or adjacent to the inner surface of the top cover-forming wall 64 to place the antenna at a maximum distance from the supporting surface of the base unit 12. This is important in those cases where the bottom wall 66 of the base unit 12 is placed in close proximity to metallic structures, e.g., electrical conduits within a wall, metallic table tops, or similar items which could detune the antenna. By so placing the antenna-forming plate 60, such detuning effects are minimized, as in the previous case. It will be further noted that the base unit mode switch 67 is similarly placed remote from the antenna-forming plate 60, again to minimize detuning effects. In service it is found that an adequate radiation pattern is obtained irrespective of whether the base unit 12 is mounted horizontally or vertically.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

Thus, although the antenna element disclosed herein has been generally described as "plate" formed of conducting foil or sheet, it will be evident to those skilled in the art that such antenna members could equally well be made of fine mesh wire screen or grids, or similar electrical equivalents.

We claim:

1. In a cordless telephone handset containing transmitter-receiver means contained within an elongated hand-grippable handset housing having ear-receiving and sound-accepting portions, said ear-receiving and sound-accepting handset housing portions each having a front wall configured to be placed adjacent to the user's face in use and a rear wall spaced apart from said front wall, and side walls joiningly extending between said front and rear handset housing walls, said transmitter-receiver means having a handset chassis ground and including earphone transducer means disposed in said ear-receiving handset housing portion for generating sound waves from electrical signals, microphone transducer means disposed in said sound-accepting housing portion for generating electrical signals from sound waves, antenna means for receiving and transmitting electromagnetic waves, and coupling network means for coupling said transmitter-receiver means to said antenna, said handset antenna means being counterpoised against said handset chassis and isolated at a distance therefrom, said handset housing being configured to be normally gripped by the user at a housing gripping portion at a distance from said handset antenna the improvement comprising:

said handset antenna means configured as a plate-shaped means having its longest dimension much less than one-fourth of the operating wavelength of said transmitter-receiver means and disposed to be spaced from said housing gripping portion, a major dimension of said antennas means being disposed to extend in a generally vertical direction when said handset housing is in position for use.

2. The handset of claim 1 wherein the longest dimension of said plate-shaped antenna means is no greater than about 1/100 of the operating wavelength of said transmitter-receiver means.

3. The handset of claim 1 wherein a major portion of said antenna means is generally planar.

4. The handset of claim 1 wherein a major portion of said handset antenna means is generally planar and said handset chassis ground includes conducting portions of at least one generally planar circuit board dispose generally parallel to the plane of said major portion of said handset antenna means.

5. The handset of claim 1 wherein said handset antenna means is contained within said handset housing.

6. The handset of claims 1, 2, or 3 wherein said handset antenna means is configured to span across substantially the entire narrow dimension of said handset housing rear wall.

7. The handset of claims 1, 2, or 3 wherein said handset antenna means is provided with at least one side extension configured to lie generally parallel to one of the handset housing sidewalls proximate thereto.

8. The handset of claim 7 wherein said side extension extends towards said handset front wall.

9. The handset of claim 8 wherein said handset antenna means is provided with a pair of said side extensions. each configured to lie generally parallel to the handset sidewall proximate thereto.

10. The handset of claims 1, 2, or 3 wherein said handset antenna means is connected to said coupling network means at a point generally centrally located on said handset antenna means.

11. The handset of claims 1, 2 or 3 wherein said major dimension of said plate-shaped handset antenna means is no more than one-half of the major dimension of said chassis.

12. The handset of claims 1, 2, or 3 wherein said coupling network means includes at least one loading coil.

13. The handset of claims 1, 2, or 3 further including a plurality of user-operable mode switches, all of said switches being disposed on a portion of said handset housing remote from said handset antenna means.

14. The handset of claim 1 in combination with a base unit having a base unit transmitter-receiver adapted for connection to telephone lines and contained within an insulating base unit housing adapted for mounting on a generally planar support surface, said base unit transmitter-receiver utilizing a base unit chassis ground contained within said base unit housing, said base unit housing having top and bottom confronting walls joined by base unit sidewalls, said base unit bottom wall being disposed to confront said mounting surface in use, said base unit further including base unit antenna means coupled to said base unit transmitter-receiver so that said base unit antenna means is counterpoised against said base unit chassis, said base unit antenna being configured as a plate-shaped means having its longest dimension much less than one-fourth of the operating wavelength of said base unit transmitter-receiver and disposed closely proximate to the surface of said base unit top wall so that said base unit bottom wall is interposed between said mounting surface and said base unit antenna means in use.

15. The combination of claim 14 further including a second mode switch disposed on a portion of said base unit housing remote from said base unit antenna means.

16. The combination of claim 14 wherein said base unit antenna means is contained within said base unit housing.

17. The combination of claim 3 wherein said base unit antenna means is disposed proximate to one of said sidewalls and is provided with at least one end extension configured to lie generally parallel to the sidewall proximate thereto.

18. The combination of claim 16 wherein said base unit antenna means is provided with a generally planar central portion and a pair of side extensions each configured extend away from said central portion towards said base unit bottom wall.

19. The combination of claims 17 or 18 wherein said base unit antenna means extensions extend approximately one-half the distance from said base unit top wall to said base unit bottom wall.

20. The handset of claim 1 wherein at least one of said transducer means is disposed in a portion of said handset remote from said gripping portion and said handset antenna means is disposed horizontally outward of said at least one of said transducer means with respect to the user's face in use.

21. The handset of claim 20 wherein said at least one transducer means is said earphone transducer means.

22. The handset of claim 20 further including conducting shield means of major dimension at least comparable to said handset plate-shaped antenna means and disposed within said handset housing to lie between the user's face in use and said handset antenna means and returned to r.f. ground.

23. The handset of claim 22 wherein said shield means includes metallic structures associated with the transducer means confronting said plate.

24. The handset of claim 22 wherein said shield means extends substantially beyond the dimensions of said transducer means confronting said handset antenna means.

25. The handset of claims 1, 2, or 3 wherein said front and rear handset walls are joined by a wall configured as a curving arc, and said plate-shaped handset antenna means is provided with an end extension configured to follow said arc.

26. The handset of claim 25 wherein said end extension extends towards said the handset front wall.

27. The handset of claim 1 wherein said handset antenna means is disposed at a portion of said rear handset housing wall.

28. The combination of claim 14 wherein the longest dimension of said base unit antenna means is no greater than about 1/100 of the operating wavelength of said base unit transmitter-receiver means.

29. The cordless telphone of claim 1 wherein said antenna means is a single plate-shaped antenna element.

30. The cordless telephone of claims 1 or 29 wherein said plate-shaped antenna means is a plate-like structure.

31. In a cordless telephone handset containing transmitter-receiver means contained within an elongated hand-grippable handset housing having an ear-receiving upper end portion and a lower end portion configured to be placed in the vicinity of the user's mouth in use, said upper end portion of said handset housing having a front vertical wall to be placed against the user's ear and a rear vertical wall remote from said front wall, and side walls extending between said front and rear handset housing walls, said handset housing being configured to be normally gripped by the user at points between said upper and lower handset housing end portions, said transmitter-receiver means having a handset chassis ground and including earphone transducer means disposed in said upper handset housing portion for generating sound waves from electrical signals, microphone means disposed in said lower handset housing portion for generating electrical signals from sound waves, antenna means for receiving and transmitting electromagnetic waves, and coupling network means for coupling said transmitter-receiver means to said antenna means, said handset antenna means being counterpoised against said handset chassis and isolated at a distance therefrom, the improvement comprising:

said handset antenna means configured as a plate-shaped element having its longest dimension much less than one-fourth of the operating wavelength of said transmitter-receiver means and confronting said earphone transducer means and spaced horizontally outward of said earphone transducer means away from the user's ear in use, a major dimension of said plate being disposed to extend in a generally vertical direction when said handset housing is in position for use.

* * * * *